Nov. 11, 1930.  F. VEDER  1,780,957
TEA BALL HOLDER
Filed Jan. 21, 1929
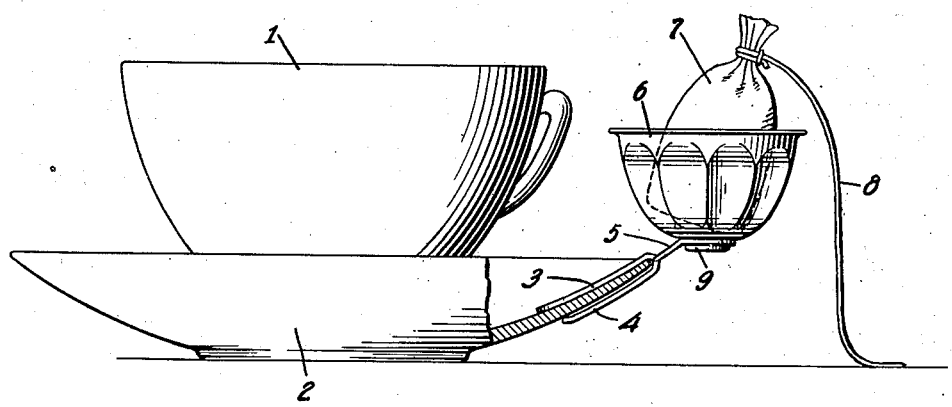
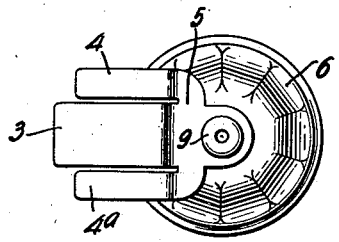
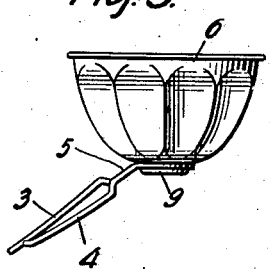
INVENTOR
Frederika Veder.
BY
Moses & Nolte
ATTORNEYS Patented Nov. 11, 1930

1,780,957

UNITED STATES PATENT OFFICE

FREDERIKA VEDER, OF NEW YORK, N. Y.

TEA-BALL HOLDER

Application filed January 21, 1929. Serial No. 334,098.

This invention relates to tea ball holders, and has for its object the provision of such a device adapted to be attached to a saucer.

While tea is often made by steeping in a pot of hot water tea leaves contained in a fabric bag, constituting what is commonly known as a tea ball, it is frequently preferable to serve the hot water and the tea ball separately, so that each drinker may steep an infusion of a strength suited to his individual taste. In the latter case it has been customary, after the tea ball has been allowed to steep in the hot water contained in the cup until the infusion is of the desired strength, to remove the saturated ball, by means of the string attached thereto, and to place it in the tea saucer or on another dish. Placing the ball in the tea saucer is objectionable for the reason that considerable of the liquid carried by the ball drains into the saucer and wets the bottom of the cup, from which it is likely to drip onto the clothing when the cup is raised to the lips. On the other hand, the provision of a separate dish solely for receiving the saturated ball necessitates extra service and is inconvenient if the cup and saucer are held in the hand of the drinker, rather than being placed upon a table. Should the teacup and saucer be served on a plate on which are also placed cakes or wafers, placing the saturated tea ball upon this plate is likely to result in wetting the cakes or wafers and thereby rendering them unappetizing. It is desirable that the tea ball, after having been once immersed in the cup, be kept conveniently near the drinker, in case it should require to be again immersed in order to either strengthen the infusion or to make a second cup thereof.

This invention provides means for furnishing individual service of hot water and tea ball which permit of the ball being kept conveniently near the drinker and at the same time obviate the objectionable results obtained with reference to the present manner of serving.

The invention will best be understood by reference to the accompanying drawings, wherein is illustrated the present preferred embodiment thereof, and in which Fig. 1 is a side elevation of a teacup resting in a tea saucer, to the rim of which saucer is attached a device embodying the invention and shown as containing a tea ball, a portion of the saucer rim being shown as broken away;

Fig. 2 is a bottom plan view of the tea ball holding device shown in Fig. 1; and Fig. 3 is a side elevation of the tea ball holding device shown detached from the saucer and showing the normal relation of the parts prior to attachment.

Like reference characters indicate like parts in both drawings.

Referring to the drawings, 1 denotes a teacup, 2 a tea seaucer to which is clipped a cup shaped tea ball container 6, by means of a clip support comprising a central spring prong 3, coacting with the side spring prongs 4 and 4ª and with the rim of the saucer. Container 6 is adapted to receive a fabric bag 7 of tea leaves, said bag being provided with a string 8 for closing and for convenience in handling the same. The support 5 and the container 6 may economically be stamped from thin sheet metal and attached to each other in any well known manner, as by spot-welding or by means of a rivet such as 9. Should the parts be riveted together, there should be employed such a type of rivet as, when upset, will insure a leak-proof joint in order that the liquid from the saturated tea ball may not leak from the container.

The central prong 3 at its base portion where it is joined with the body portion 5 of the clip support is offset upwardly, and the side prongs 4 and 4ª at their base portions where they are joined with the body portion 5 of the clip support are offset downwardly, so that, at the base portions of the prongs adjacent the body portion 5, the side and central prongs lie in different planes separated by a distance equal, at least to the thickness of a saucer rim. From this point outward the prongs converge so that when put under stress and displaced to clip the rim of a saucer, they may lie substantially flush with the faces of the saucer and will not diverge. The central prong is substantially longer than the side prongs, with the result that when the container 6 is held in the hand the protruding end portion of the central prong may be engaged with the saucer rim independently of the side prongs and put under stress by movement of the container, to provide an ample opening between the central and side prongs to enable the support to be conveniently slid into gripping relation with the rim of the saucer.

I have described what I believe to be the best embodiment of my invention. I do not wish, however, to be confined to the embodiment shown, but what I desire to cover by Letters Patent is set forth in the appended claims.

I claim:

1. A tea ball holder comprising a watertight cup-shaped container, and a saucer gripping support for the container, comprising a central resilient prong adapted to engage one face of the saucer and a pair of side prongs adapted to engage the opposite face of the saucer, the central prong being substantially longer than the lateral prongs to enable the protruding end portion of the central prong to be engaged with the saucer rim and stressed to provide a sufficient opening between the central and side prongs for easy reception of the margin of the saucer, the prong opening being situated at the inner extremity of the support and the container being mounted upon the outer extremity of the support.

2. A tea ball holder comprising a watertight cup-shaped container, and a saucer gripping support having the container mounted on the outer extremity thereof, comprising a body portion, a central resilient prong extending away from the container and adapted to engage one face of the saucer and a pair of shorter side prongs also extending away from the container and adapted to engage the opposite face of the saucer, the central prong being offset in one direction from the plane of the body portion and the side prongs being offset in the opposite direction to provide a total separation at the bases of the prongs at least equal to the thickness of the saucer, so that the prongs may be spread to grip the saucer and yet be substantially flush with the faces thereof, the side and central prongs converging toward their ends into substantial coincidence when unstressed.

In testimony whereof I have affixed my signature to this specification.

FREDERIKA VEDER.